2,992,073
SYNTHESIS OF SULFUR TETRAFLUORIDE
Charles W. Tullock, Wilmington, Del., assignor to E. I. du Pont de Nemours and Company, Wilmington, Del., a corporation of Delaware
No Drawing. Filed Mar. 12, 1959, Ser. No. 798,828
18 Claims. (Cl. 23—205)

This invention relates to a new process for the synthesis of sulfur tetrafluoride.

This application is a continuation-in-part of my application Ser. No. 664,154, filed June 7, 1957, in turn a continuation-in-part of my application Ser. No. 603,880, filed August 14, 1956, and both now abandoned.

Sulfur tetrafluoride (sulfur (IV) fluoride, $SF_4$) has not been extensively studied, primarily because the methods of synthesizing it known heretofore (see the article by Brown and Robinson in J. Chem. Soc. 1955, 3147) are all based ultimately on the use of elemental fluorine, and are therefore expensive and poorly adapted to large scale operations. It is known (U.S. Patent 2,709,186) that sulfur tetrafluoride can be converted to the technically highly valuable tetrafluoroethylene by reaction with carbon at high temperatudes, e.g., by passage through a carbon arc. This and other uses for sulfur tetrafluoride have not been exploited because of difficulties in preparing this compound such as those mentioned.

An object of this invention is, therefore, provision of a novel method for synthesizing sulfur tetrafluoride.

Another object is provision of a method for synthesizing sulfur tetrafluoride which does not involve the use of elemental fluorine.

The above-mentioned and yet other objects are achieved in accordance with this invention by a process in which an alkali metal fluoride of atomic number 11 to 55, inclusive, is reacted with chlorine and sulfur from suitable chlorine- and sulfur-supplying reactants under substantially anhydrous conditions and at a temperature of at least 20° C., whereby sulfur tetrafluoride is produced.

In this reaction, the chlorine and the sulfur can be employed either in elemental or in combined form. Thus, the reaction mixture can comprise, in addition to the alkali metal fluoride, sulfur and chlorine as the separate elements; or sulfur dichloride, $SCl_2$, with or without additional chlorine; or sulfur monochloride, $S_2Cl_2$, with or without additional chlorine.

While the mechanism of the reaction is not known with certainty, it appears that the stoichiometry of the process, using the above-mentioned sets of reactants, can be represented by the following equations, wherein MF denotes an alkali metal fluoride.

(1) $S + 2Cl_2 + 4MF \rightarrow SF_4 + 4MCl$
(2) $SCl_2 + Cl_2 + 4MF \rightarrow SF_4 + 4MCl$
(3) $S_2Cl_2 + 3Cl_2 + 8MF \rightarrow 2SF_4 + 8MCl$
(4) $3SCl_2 + 4MF \rightarrow SF_4 + S_2Cl_2 + 4MCl$
(5) $2S_2Cl_2 + 4MF \rightarrow SF_4 + 3S + 4MCl$
(6) $3S + 3Cl_2 + 4MF \rightarrow SF_4 + S_2Cl_2 + 4MCl$ In Reactions 1, 2 and 3 above, the sole primary reaction products are sulfur tetrafluoride and the alkali metal chloride corresponding to the alkali metal fluoride employed. In Reactions 4 and 5, there are formed in addition sulfur monochloride and sulfur, respectively. Reaction 6 uses the same reactants as Reaction 1 but with an excess of sulfur, and it has been found that sulfur monochloride is formed in such a system.

Instead of sulfur or a sulfur chloride, it is also possible to use chlorine and one of a class of sulfur-supplying reactants, the binary sulfides, which, in contact with chlorine under the operating conditions, form sulfur and/or a sulfur chloride. Such sulfur-supplying reactants include the sulfides of metals of groups I and II of the periodic table and of those metals in group VIII which have atomic numbers from 26 to 28. Suitable sulfides are, for example, the sulfides of sodium, potassium, calcium, barium, iron, cobalt, nickel, copper, zinc, cadmium and mercury. The alkali metal sulfides are preferred for this purpose. With an alkali metal sulfide, the overall reaction may be represented by the equation:

(7) 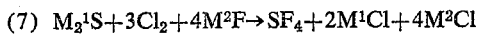

where $M^1$ and $M^2$ represent alkali metals which need not be the same. This embodiment of the invention is illustrated in Example XXII, infra.

It is by no means essential to use the reactants in precisely the stoichiometrical proportions shown in the above equations. In fact, it is in general desirable to operate, in all systems, with a slight to moderate excess of alkali metal fluoride over the amounts shown, e.g., a 5–50% excess. However, in the interest of efficient utilization of the reactants, it is recommended to have the chlorine and the sulfur present in the system (separately or combined) in such amounts that the atom ratio Cl:S is at least 1:1. Since sulfur monochloride, where the Cl:S ratio is 1:1 (when no additional chlorine is used) is much less effective than the other systems, it is preferred to use the chlorine and the sulfur (separately or combined) in an atom ratio Cl:S of at least 1.5:1, and still more preferably at least 2:1.

Any alkali metal fluoride in anhydrous form can be used, in which fluoride the alkali metal has an atomic number from 11 to 55, inclusive. Cesium and rubidium fluorides are the most reactive, but they are not readily accessible. Sodium and potassium fluoride are the most useful and preferred reactants.

The process can be carried out with or without the use of a liquid reaction medium, with substantially equivalent results as regards conversions to sulfur tetrafluoride. However, the use of certain specific reaction media, characterized by a high dielectric constant, has a marked effect on the reaction temperature. As more fully discussed below, these special media, particularly when used with sulfur dichloride as the sulfur-chlorine reactant, permit conducting the reaction at temperatures as low as the ordinary ambient temperature of about 20° C.

When no diluent is used, or when an organic liquid of low dielectric constant (below about 20) is used as the reaction medium, the appropriate reaction temperature depends chiefly on the reactivity of the alkali metal fluoride. A highly reactive fluoride such as cesium fluoride reacts with sulfur and chlorine at temperatures as low as about 80° C. The less reactive sodium fluoride normally requires heating to at least 125° C., preferably 150° C. or above to secure a practical reaction rate. The upper limit of temperature, with any set of reactants, is dictated chiefly by the fact that, at high temperatures, sulfur tetrafluoride disproportionates to sulfur hexafluoride and sulfur, and also by the increased corrosive effect of the reactants on the usual materials of construction. For these reasons, temperatures above 400° C. are not recommended, although appreciable amounts of sulfur tetrafluoride are formed at temperatures up to 600° C. In general, the best conversions are obtained at temperatures below 300° C., and such temperatures are therefore preferred.

As already mentioned, reaction media of a specific type permit carrying out the process at low or very moderate temperatures, e.g., in the range of 20–150° C., and preferably 40–90° C., using sulfur dichloride, alone or with excess chlorine, as the sulfur-chlorine reactant. These particular media are organic compounds, liquid under the operating conditions, which have a high dielectric constant, at least 20 when measured at or above 20° C. The function of these high dielectric constant media is not clearly understood. It is possible that they solvate the chlorine atoms, making them more reactive, or that they ionize the sulfur dichloride. The suitability of a liquid medium of this type is not connected with its ability to dissolve the alkali metal fluoride since many of them have little or no solvent action on these salts. However, the reaction medium should be one in which the sulfur chloride is at least partly soluble, for example to the extent of 20% by weight. Preferably, the reaction medium is miscible with the sulfur chloride. In using these special reaction media at the low reaction temperatures which they make possible, sulfur dichloride, alone or with additional chlorine, is the reactant of choice. Sulfur monochloride or sulfur and chlorine can be used, but they give very much lower conversions and are therefore not recommended.

The high dielectric reaction medium need not be completely inert toward the reactants. For example, certain compounds which are susceptible to chlorination at elevated temperatures, such as tetramethylene cyclic sulfone, are suitable as reaction media. However, it is of course desirable that the reaction medium be one that is not readily attacked by the reactants under the operating conditions, since otherwise the conversions would be adversely affected. There is a simple visual test whereby undesirably reactive reaction media can be recognized. This consists in maintaining in contact for a few moments at reaction temperature, e.g., 50–100° C., the chlorine-containing reactant with an excess of the medium being tested. A highly reactive medium, under these conditions, will discharge the characteristic red color of sulfur dichloride with gas formation and heat evolution. Thus, certain liquids can readily be recognized as unsuitable in spite of their favorable dielectric constants. These include, for example, hydrogen cyanide, alcohols, ketones, acids, certain nitriles, certain amides and other compounds.

The amount of reaction medium present in the reaction mixture is not critical. It need only be sufficient to keep the mixture fluid and to insure contact between the reactants. In practice, there is preferably used a weight of reaction medium at least equal to the weight of alkali metal fluoride.

Suitable reaction media, all having having a dielectric constant of at least 20 at 20° C., include acetonitrile, propionitrile, butyronitrile, crotononitrile, adiponitrile, benzonitrile, methyl cyanoacetate, ethyl cyanoacetate, N,N-dimethylformamide, N,N-dimethylacetamide, nitromethane, nitroethane, 1-nitropropane, 2-nitropropane, nitrobenzene, o-nitrotoluene, p-nitrotoluene, 1-chloro-2-nitrobenzene, methyl o-nitrobenzoate, dimethyl sulfate, diethyl sulfate, cyclic tetramethylene sulfone, ethylene carbonate, etc. The preferred reaction media, because of their inertness towards the chlorine-containing reactant under the operating conditions, are the nitriles, N,N-disubstituted carbonamides, nitro compounds, sulfones and alkyl sulfates which, except for the functional groups, are hydrocarbon. Otherwise stated, the preferred reaction media are those compounds, having dielectric constant of at least 20 at 20° C., which contain only carbon, hydrogen and one of the groups

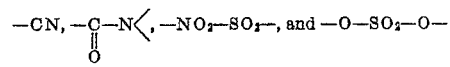

When it is not desired to use one of the above-discussed high dielectric constant reaction media, the reaction is preferably conducted without added diluent. However, the presence of an organic liquid of low dielectric constant, while it offers no special advantages, does no harm, provided the medium is substantially inert towards the reactants and towards sulfur tetrafluoride at the relatively high temperatures which are generally necessary. Among suitable diluents of this kind may be mentioned in particular the perfluorinated hydrocarbons such as perfluoro-n-heptane, perfluoro-n-decane, perfluoro(methylcyclohexane), and the like. As already mentioned, it is in general necessary, in the absence of a high dielectric constant reaction medium, to operate at higher temperatures, for example in the range of 100–300° C., and preferably 150–250° C.

When a high dielectric constant reaction medium is used, the process can be carried out at or near atmospheric pressure, the sulfur tetrafluoride (a gas boiling at about —40° C.) being permitted to escape from the reaction mixture and being led to cold receivers where it is condensed. Atmospheric pressure conditions can also be used in the absence of a diluent, for example by passing the chlorine-containing reactant through a column of finely divided alkali metal fluoride maintained at the reaction temperature. However, sufficient contact time should be provided under these conditions, which in general necessitates repeated recycling. In the absence of a diluent, or in the presence of a diluent of low dielectric constant, it is normally more convenient to operate in closed pressure vessels under the autogenous pressure developed by the reactants at the reaction temperature. The vessels are preferably agitated, although this is not essential, and it is desirable to evacuate them substantially free of air before introducing the volatile reactants. Depending on the temperature and on the reactivity of the alkali metal fluoride, reaction times of about 30 minutes to 12 hours or more can be used. A suitable material of construction for the pressure vessels is the commercially available alloy of nickel, iron and molybdenum known as "Hastelloy" C. In those of the following examples which describe experiments in pressure vessels, the vessels were made of that material.

To isolate the sulfur tetrafluoride from the reaction mixture, the volatile reaction products are first separated by evaporation, if desired under reduced pressure, from the non-volatile products (alkali metal chloride, unreacted alkali metal fluoride, sulfur, if any). The volatile material may contain, besides sulfur tetrafluoride, one or both of the sulfur chlorides and chlorine. Thionyl fluoride, sulfuryl fluoride, and hydrogen fluoride may also be present. These products are formed through hydrolysis of the sulfur tetrafluoride by adventitious moisture or through the presence of oxygen-containing impurities in the reactants. It should be noted in this connection that the methods of product analysis (infrared and mass spectroscopy) used in the examples which follow tend to magnify the amount of thionyl fluoride present beyond that actually formed, because of the possibility of additional hydrolysis in the analytical equipment of the sample being tested.

Analysis of the gaseous reaction product also shows occasionally the presence of small amounts of silicon tetrafluoride, which is formed through attack of the glass analytical cells, or of the glass elements in the reactor, if any are used, by the hydrogen fluoride which may be present.

Isolation of the sulfur tetrafluoride in an essentially pure state can be carried out by one of the following procedures:

First, the more volatile (gaseous) portions of the reaction product are removed from the sulfur monochloride and sulfur dichloride. This is readily done by a simple distillation, which also removes most or all of the hydrogen fluoride, if any is present. The remainder consists essentially of sulfur tetrafluoride, often containing varying amounts of thionyl fluoride and chlorine and occasionally some sulfur hexafluoride. Thionyl fluoride and chlorine have boiling points close to that of sulfur tetrafluoride, but they can nevertheless be separated from it by fractionation, owing to the fact that they form a constant boiling mixture with sulfur tetrafluoride. This mixture distills first, and the remainder of the product is substantially pure sulfur tetrafluoride. Chlorine can also be removed from the gaseous reaction product, or from the above-mentioned constant boiling mixture, by treatment with sulfur, which absorbs chlorine with the formation of sulfur chlorides. This treatment can be effected by passing the gaseous mixture through a column packed with small pieces of sulfur, or by maintaining it in contact with sulfur at room temperature and autogenous pressure in closed vessels for a short period of time.

Another method of separating sulfur tetrafluoride from the other gaseous reaction products which may be present is essentially that described by Bartlett and Robinson (Chemistry and Industry, 1956, 1351; Proc. Chem. Soc., 1957, 230). This consists in bringing the gaseous reaction product in contact with certain binary fluorides such as boron trifluoride, arsenic pentafluoride or antimony pentafluoride, which form addition complexes with sulfur tetrafluoride but not with the other sulfur fluorides such as thionyl fluoride or sulfur hexafluoride. These complexes can be isolated, then used to regenerate pure sulfur tetrafluoride. With the complexes from non-gaseous binary fluorides, such as the $SF_4 \cdot SbF_5$ complex, this can be done simply by warming above the dissociation temperature. With other complexes, the sulfur tetrafluoride can be displaced by treatment with selenium tetrafluoride, the latter being a relatively easily prepared compound.

Mixtures of sulfur tetrafluoride and sulfur hexafluoride, which can form when the process is carried out at high temperatures, can be separated by fractional distillation, or by contacting the mixture with a tertiary amine (e.g., pyridine, triethylamine, etc.) at 100° C. or lower. Under such conditions, sulfur tetrafluoride forms a liquid or solid adduct with the tertiary amine, whereas sulfur hexafluoride does not react. The adduct is then separated, and pure sulfur tetrafluoride is recovered from it by dissociation at reduced pressure or elevated temperature.

When sulfur tetrafluoride is to be used to prepare tetrafluoroethylene by contact with carbon at high temperature, the presence of thionyl fluoride or sulfur hexafluoride is not detrimental since these fluorides are also converted to tetrafluoroethylene under the same conditions, as shown in U.S. Patents 2,722,559 and 2,709,186.

The following examples serve to illustrate, but not to limit, the invention. Boiling points were taken at 760 mm. of mercury pressure. Examples I–XI deal with the use of a reaction medium having a dielectric constant of at least 20.

EXAMPLE I

In a flask provided with a stirrer, dropping funnel and spiral condenser, the top of which was attached to a glass trap cooled to −80° C. and protected from moisture, was placed 150 g. (3.57 moles) of sodium fluoride and 176 g. (4.3 moles) of acetonitrile. To this mixture was added with stirring over a period of seven minutes 140 g. (1.36 moles) of freshly distilled sulfur dichloride. There was a mild evolution of heat during this addition. After the sulfur dichloride was all added, the stirrer was replaced by a thermometer and the flask was heated externally to keep the reaction mixture at an internal temperature of 40–75° C. for three hours. During this period, 50 g. of condensate was collected in the glass trap, of which 48 g. was volatile at room temperature. Distillation of this material in a low temperature still gave 37 g. of product boiling in the range of −40° to −28° C., chiefly between −40° and −33° C. This distillate was found by mass spectrometric analysis to contain, on a molar basis, 84–88% sulfur tetrafluoride and 6–15% thionyl fluoride. It contained no chlorine, as shown by the fact that a test portion did not cause iodine separation from aqueous potassium iodide. This indicated that there was no appreciable decomposition of the sulfur dichloride to sulfur monochloride and chlorine during the reaction.

The distilled reaction product can be further purified by maintaining it in contact with antimony pentafluoride until the $SF_4 \cdot SbF_5$ complex has formed, isolating the complex, and regenerating $SF_4$ therefrom.

The identity of the sulfur tetrafluoride was further confirmed by the nuclear magnetic resonance spectrum of the reaction product, which agreed completely with that of an authentic sample. In addition, the distilled sulfur tetrafluoride was found to have a gas density of 0.004766, corresponding to a molecular weight of 106.8 (calculated for $SF_4$: 108). The yield of sulfur tetrafluoride was 65–70%.

The solid remaining in the flask at the end of the reaction was freed of acetonitrile and sulfur chlorides by washing with diethyl ether. It was a mixture of unreacted sodium fluoride (originally present in excess) and sodium chloride. The mixture contained 37.16% chloride ion, indicating complete conversion according to the equation:

$$3SCl_2 + 4NaF \rightarrow SF_4 + S_2Cl_2 + 4NaCl$$

The failure to obtain all of the sulfur tetrafluoride corresponding to complete conversion was due to mechanical losses in the isolation of the product.

The liquid extracted by the ether wash was found on distillation to consist essentially of a yellowish-colored fraction, B.P. 80–81° C., having a sharp sulfur chloride odor. This was a constant boiling mixture of acetonitrile and sulfur monochloride containing approximately 85% of the former on a molar basis, as indicated by infrared analysis and confirmed by preparation of a synthetic mixture of this composition, which distilled at 80–81° C. In a duplication of this example, it was possible to isolate and identify a portion of the sulfur monochloride formed, in addition to the above-mentioned constant boiling mixture with acetonitrile.

EXAMPLES II–VI

The results of five other runs, carried out substantially as described above, but with other reaction media, are tabulated below. In all these examples there was used 75 g. (1.78 moles) of sodium fluoride, 70 g. (0.68 mole) of sulfur dichloride and 110 ml. of the tabulated reaction medium. The reaction was carried out at the indicated temperature for the indicated time with intermittent agitation. The gaseous reaction product was collected as in Example I and the sulfur tetrafluoride content determined by mass spectrometry. The conversions were calculated from the amount of sodium chloride formed and include the thionyl fluoride present, formed from the sulfur tetrafluoride by hydrolysis.

In all cases, further purification can be effected as described in Example I.

Table

| Example | Reaction Medium | Temp., °C. | Time, Hours | Product Composition, Moles percent [1] | Percent Conversion |
|---------|-----------------|------------|-------------|----------------------------------------|--------------------|
| II      | Dimethylformamide | 58.5–77  | 3.6         | $SF_4$ (42–47) <br> $SOF_2$ (43–48)    | 100                |
| III     | Nitroethane     | 60–75      | 2.8         | $SF_4$ (43–48) <br> $SOF_2$ (21–24)    | 55                 |
| IV      | Nitrobenzene    | 60–78      | 3.7         | $SF_4$ (14–15) <br> $SOF_2$ (16–18) <br> $Cl_2$ present | 44 |
| V       | Dimethyl sulfate | 62–75.5   | 3.0         | $SF_4$ (17–19) <br> $SOF_2$ (8.5–10) <br> $Cl_2$ present <br> $CH_3Cl$ present | 36 |
| VI      | Benzonitrile    | 52–80      | 2.0         | $SF_4$ (28–30) <br> $SOF_2$ (6–7)      | 96                 |

[1] The portion not accounted for is chiefly or exclusively air.

EXAMPLE VII

In a variation of the procedure used in the preceding examples, a mixture of 93 g. of sodium fluoride and 250 ml. of acetonitrile was preheated to 65–70° C. and 153 g. of sulfur dichloride was run gradually into the hot mixture with continuous stirring during a period of 1.5 hours, after which the mixture was heated at 70–75° C. with stirring for three hours. The product contained 85–89% of sulfur tetrafluoride and 10–11% of thionyl fluoride on a molar basis. The yield of sulfur tetrafluoride was 59%.

When this preparation was repeated under the same conditions, but using 244 g. of a technical grade of sulfur dichloride which had been only partly purified by removal from it of about 15% of lower boiling material, the yield was substantially the same.

EXAMPLE VIII

To a mixture of 75 g. of sodium fluoride and 110 ml. of cyclic tetramethylene sulfone was added at once 72 g. of sulfur dichloride. An active reaction took place, following which the mixture was heated at 50–73° C. for 4.5 hours with intermittent agitation. The reaction product contained, on a molar basis, 68–72% of sulfur tetrafluoride and 22–24% of thionyl fluoride. The yield was 45%.

EXAMPLE IX

To a mixture of 104 g. of finely-divided potassium fluoride and 110 ml. of acetonitrile was added at once 72 g. of sulfur dichloride. The mixture was heated at 50–72° C. for 4.5 hours with intermittent agitation. The product contained, on a molar basis, 53–58% of sulfur tetrafluoride and 23–26% of thionyl fluoride. The yield was 43%.

EXAMPLE X

A one-liter pressure vessel was charged with 63 g. of sodium fluoride, 52 g. of sulfur dichloride, 35 g. of chlorine, and 175 ml. of tetramethylene cyclic sulfone. The vessel was heated with rocking at 50° C. for one hour, then at 85° C. for one hour. The volatile product (41 g.) was distilled. The distillate (−31° to −40° C.) was found by mass spectrometry to contain, on a molar basis, 54–59% of $SF_4$, 27–30% of $SOF_2$, and chlorine. The conversion of the sulfur dichloride to sulfur fluorides was about 93%, based on the amount of chloride ion in the solid reaction product.

EXAMPLE XI

This example uses the ingredients and general procedure of Example I but it serves to illustrate how the preparation and purification of sulfur tetrafluoride can be carried out on a much larger scale:

To a steam jacketed, lead-lined autoclave, fitted with an agitator and a 5 ft. long by 3 in. inside diameter reflux column, and having an effective volume of about 16 gallons was charged 20 lb. of sodium fluoride and 45 lb. of acetonitrile. The contents were heated at atmospheric pressure to 68–72° C. with agitation. Fifty pounds of sulfur dichloride was then fed at a rate of about 0.5 lb./min., maintaining the autoclave contents at 70–75° C. and atmospheric pressure. After an induction period, during which 15 lb. of the sulfur chloride had been added, sulfur tetrafluoride began to reflux in the column as evidenced by (1) a rather sharp increase in the pressure drop across the column, and (2) a sharp "break" in the temperature profile in the column. This "break" was maintained at a point about half-way up the column, and the pressure drop was maintained at 0.2–4.0 inches of water by controlling the amount of coolant flowing to the partial condenser. The reaction was allowed to proceed for 3.5 hours. The gaseous product was collected as a liquid in a cooled stainless steel container which was vented to the atmosphere through a $CaSO_4$ drying tube.

The crude product thus obtained weighed 9.5 lb. and had the following composition, as determined by ultraviolet and mass spectrometric analyses:

| Component: | Mol percent |
|------------|-------------|
| $SF_4$     | 65.5        |
| $SO_2FCl$  | 0.3         |
| $SOF_2$    | 4.9         |
| $CO_2$     | 0.3         |
| $SO_2$     | 0.2         |
| $SiF_4$    | 0.1         |
| $N_2+CO$   | 6.8         |
| $Cl_2$     | 22.0        |

Chlorine can be effectively removed from the product by treatment with elemental sulfur. This was accomplished by passing the mixture having the composition described above in the vapor phase, at 15° C. and atmospheric pressure and at the rate of 120 g./hr., through a glass column 27″ long and 1.75″ inside diameter packed with lumps of sulfur of ¼ to ½″ size. After this treatment, the gaseous product contained less than 0.3 mole percent of chlorine.

The quality of the crude reaction product can be further upgraded by fractional distillation. This was accomplished by distilling a mixture of approximate molar composition 83% sulfur tetrafluoride, 14% thionyl fluoride and 1.5% chlorine, plus minor impurities, through a stainless steel column 7′ long and 3″ inside diameter packed with ¼″ protruded nickel packing. A low boiling foreshot boiling over the range −44 to −40° C. was removed by distillation at atmospheric pressure. The remainder of the distillate contained no chlorine and only a little thionyl fluoride. It showed the following analysis:

| Component: | Mol percent |
|---|---|
| $SF_4$ | 93.8 |
| $SO_2F_2$ | 0.2 |
| $SiF_4$ | 0.2 |
| $SOF_2$ | 4.8 |
| $CS_2$ | 0.2 |
| $CO_2$ | 0.2 |
| Air | 0.7 |

The following examples describe reactions using no diluent. In Examples XII–XV the reactants (besides the alkali metal fluoride) are elemental sulfur and elemental chlorine; in Examples XVI–XVIII, sulfur dichloride and chlorine; in Example XIX, sulfur monochloride and chlorine; in Example XX, sulfur dichloride alone; and in Example XXI, sulfur monochloride alone. Example XXII illustrates the use of a binary sulfide as the sulfur-supplying reactant.

EXAMPLE XII

A one-liter bomb was evacuated and charged with 32 g. of sulfur, 142 g. of chlorine and 200 g. of sodium fluoride. The bomb was heated with rocking at 50° C. for 6 hours, at 100° C. for 2 hours, at 150° C. for 2 hours, then at 225° C. for 4 hours. The crude volatile product (110 g.) was distilled, giving 94 g. of distillate boiling between −32° and −39° C. This product was found by mass spectroscopy to contain, on a molar basis, 80–85% of $SF_4$, 7.5–8% of $SOF_2$, and chlorine. The conversion to sulfur fluoride was about 80%, based on the chloride ion present in the solid product.

When the same reactants in the same proportions were heated in a bomb at 290° C. for one hour, the crude gaseous product was found by infrared analysis to contain 20 mole percent $SF_4$, 5 mole percent $SOF_2$, 5 mole percent $SiF_4$, and chlorine. The conversion was about 76%.

EXAMPLE XIII

A 200-ml. bomb was evacuated and charged with 4 g. of sulfur, 27 g. of chlorine and 40 g. of sodium fluoride. The bomb was heated without agitation at 450° C. for 4 hours. The crude volatile product (21 g.) was stored over sulfur to remove the unreacted chlorine. The remaining volatile product (13 g.) was found by infrared analysis to contain, on a molar basis, 45–50% of $SF_4$, 40% of $SOF_2$, and some $SF_6$. The conversion of sulfur to sulfur fluorides was about 70%, based on the chloride ion present in the solid product.

Essentially pure sulfur tetrafluoride can be isolated from the gaseous reaction product by treating it as described in Example I.

EXAMPLE XIV

In this example the reactants, chlorine and sulfur, were used with an excess of the latter over the calculated amount (ratio Cl:S=1.8:1).

A mixture of 64 g. of sulfur, 130 g. of chlorine and 150 g. of sodium fluoride was heated in a rocked pressure vessel at 50° C. for 4 hours, 150° C. for 1 hour and 235° C. for 4 hours. The crude gaseous product was found by infrared analysis to contain, on a molar basis, a 95% $SF_4$, 5% $SOF_2$ and no chlorine. This was nearly pure sulfur tetrafluoride, even though not distilled. The yield was about 93%, based on the chloride ion in the solid product.

The non-gaseous product in this and similar runs where sulfur was used in excess contained substantial amounts of sulfur monochloride.

EXAMPLE XV

A small pressure vessel was evacuated free of air and charged with 3g. of sulfur, 12 g. of chlorine, and 50 g. of cesium fluoride. The vessel was heated at 100° C. for 12 hours without agitation. The crude gaseous product (7 g.) was found by infrared analysis to contain, on a molar basis, 30% $SF_4$, 30% $SOF_2$, 10% $SiF_4$, with chlorine, some carbon dioxide and some hydrogen chloride. The conversion of sulfur to sulfur fluorides, based on the chloride ion present in the solid product, was about 68%.

EXAMPLE XVI

A 1-liter bomb was evacuated free of air and charged with 103 g. of sulfur dichloride, 71 g. of chlorine and 200 g. of sodium fluoride. The bomb was rocked and heated at 75° C. for 2 hours, 150° C. for 2 hours, and 250° C. for 4 hours. Distillation of the crude volatile product (114 g.) gave 105 g. of distillate which infrared analysis showed to contain, on a molar basis, 82–87% $SF_4$, 7–7.5% $SOF_2$, and chlorine. The conversion to sulfur tetrafluoride was of the order of 95%.

EXAMPLE XVII

Using the reactants of the preceding example, but with a large excess of chlorine, a mixture of 103 g. of sulfur dichloride, 142 g. of chlorine and 252 g. of sodium fluoride was heated in a rocked bomb at 50° C. for 2 hours, 100° C. for 2 hours, 150° C. for 1 hour, and 225° C. for 2 hours. The crude gaseous product (195 g.) gave on distillation 189 g. of distillate boiling at −39° to −42° C. This distillate contained, on a molar basis, 40% $SF_4$, 5% $SOF_2$, 5% $SiF_4$, and chlorine. The conversion to sulfur tetrafluoride was essentially quantitative.

EXAMPLE XVIII

A mixture of 77 g. of sulfur dichloride, 53 g. of chlorine, and 208 g. of potassium fluoride was heated in an agitated pressure vessel at 100° C. for 2 hours, then at 250° C. for 4 hours. The crude volatile reaction product was found to contain, on a molar basis, 20% $SF_4$, 10% $SOF_2$, 5% $SiF_4$, 5% HCl, and chlorine. The conversion of sulfur dichloride to sulfur fluorides was about 52%.

EXAMPLE XIX

A 1-liter bomb was evacuated and charged with 67.5 g. of sulfur monochloride, 107 g. of chlorine and 200 g. of sodium fluoride. The bomb was heated with rocking at 50° C. for 6 hours, 100° C. for 2 hours, 150° C. for 2 hours, and 225° C. for 4 hours. The crude volatile product (117 g.) gave on distillation 99 g. of gas boiling at −38° to −43° C. This was found by infrared analysis to contain, on a molar basis, 70% $SF_4$, about 5% $SOF_2$, and chlorine. The crude reaction product also contained 9 g. of sulfur dichloride, presumably formed by the side reaction $S_2Cl_2 + Cl_2 \rightarrow 2SCl_2$. The conversion to sulfur tetrafluoride was about 82%.

A duplication of the above experiment, except that the reaction temperature was 150° C. for 8 hours, gave a material containing larger amounts of sulfur dichloride byproduct. The conversion to sulfur tetrafluoride was about 17%.

EXAMPLE XX

A 1-liter bomb, evacuated free of air, was charged with 206 g. of sulfur dichloride and 150 g. of sodium fluoride. The bomb was heated with rocking at 75° C. for one hour, 150° C. for one hour, and 250° C. for 4 hours. The crude volatile material (69 g.) gave 58 g. of distillate at −34° to −38° C., which was found by infrared analysis to contain, on a molar basis, 80% $SF_4$, 15% $SOF_2$, and 5% $SiF_4$. The crude gaseous product contained 6 g. of unreacted sulfur dichloride. There was also found 75 g. of sulfur monochloride formed during the reaction. The yield of sulfur tetrafluoride, based on the sulfur dichloride consumed, was about 79%.

A duplication of the above experiment, except that the bomb was heated at 150° C. for 8 hours, gave a product containing larger amounts of unreacted sulfur dichloride. The yield of sulfur tetrafluoride was about 21%.

EXAMPLE XXI

A 1-liter bomb, evacuated free of air, was charged with 135 g. of sulfur monochloride and 170 g. of sodium fluoride. The bomb was heated with agitation at 250° C. for 12 hours. The crude volatile product (5 g.) was found by infrared analysis to contain, on a molar basis, 50% $SF_4$, 35% $SOF_2$, and about 5% $SiF_4$. Sulfur (3.5 g.) was obtained from the solid reaction product by sublimation. The conversion to sulfur tetrafluoride was about 12%.

EXAMPLE XXII

A 1-liter bomb was charged with 37 g. of anhydrous potassium sulfide, 56 g. of sodium fluoride and 71 g. of chlorine. The bomb was heated with rocking at 50° C. for 2 hours, 100° C. for 2 hours, 150° C. for 2 hours, and 225° C. for 8 hours. The gaseous reaction product was shown by infrared analysis to contain, on a molar basis, 40–45% $SF_4$, 5% $SOF_2$, 5% $SO_2F_2$, less than 5% $SiF_4$, and chlorine. Chlorine ion analysis of the solid product indicated a conversion to sulfur tetrafluoride of the order of 65%.

Since various modifications in my invention will be apparent to those skilled in the chemical arts, I propose to be bound solely by the appended claims.

The embodiments of the invention in which an exclusive property or privilege is claimed are defined as follows:

1. The process for the preparation of sulfur tetrafluoride which comprises (1) reacting, in a reaction zone under substantially anhydrous conditions and at a temperature between about 20 and 600° C., a fluoride of an alkali metal of atomic number 11 to 55 with chlorine supplied by at least one member of the group consisting of elemental chlorine, sulfur dichloride and sulfur monochloride and sulfur supplied by at least one member of the group consisting of elemental sulfur, sulfur dichloride and sulfur monochloride, with the proviso that, at temperatures below 100° C., sulfur dichloride and a liquid reaction medium which is substantially inert towards the reactants at the reaction temperature and which has a dielectric constant at 20° C. of at least about 20 are employed, (2) removing the gaseous reaction products from the reaction zone under substantially anhydrous conditions, and (3) subsequently recovering sulfur tetrafluoride from the gaseous reaction products.

2. The process for the preparation of sulfur tetrafluoride which comprises (1) reacting, in a reaction zone under substantially anhydrous conditions and at a temperature of about 100–600° C., a member of the group consisting of sodium and potassium fluorides with elemental sulfur and elemental chlorine, (2) removing the gaseous reaction products from the reaction zone under substantially anhydrous conditions, and (3) subsequently recovering sulfur tetrafluoride from the gaseous reaction products.

3. The process for the preparation of sulfur tetrafluoride which comprises (1) reacting, in a reaction zone under substantially anhydrous conditions and at a temperature of about 100–600° C., a member of the group consisting of sodium and potassium fluorides with sulfur dichloride, (2) removing the gaseous reaction products from the reaction zone under substantially anhydrous conditions, and (3) subsequently recovering sulfur tetrafluoride from the gaseous reaction products.

4. The process for the preparation of sulfur tetrafluoride which comprises (1) reacting, in a reaction zone under substantially anhydrous conditions and at a temperature of about 100–600° C., a member of the group consisting of sodium and potassium fluorides with sulfur dichloride and elemental chlorine, (2) removing the gaseous reaction products from the reaction zone under substantially anhydrous conditions, and (3) subsequently recovering sulfur tetrafluoride from the gaseous reaction products.

5. The process for the preparation of sulfur tetrafluoride which comprises (1) reacting, in a reaction zone under substantially anhydrous conditions and at a temperature of about 100–600° C., a member of the group consisting of sodium and potassium fluorides with sulfur monochloride, (2) removing the gaseous reaction products from the reaction zone under substantially anhydrous conditions, and (3) subsequently recovering sulfur tetrafluoride from the gaseous reaction products.

6. The process for the preparation of sulfur tetrafluoride which comprises (1) reacting, in a reaction zone under substantially anhydrous conditions and at a temperature of about 100–600° C., a member of the group consisting of sodium and potassium fluorides with sulfur monochloride and elemental chlorine, (2) removing the gaseous reaction products from the reaction zone under substantially anhydrous conditions, and (3) subsequently recovering sulfur tetrafluoride from the gaseous reaction products.

7. In the preparation of sulfur tetrafluoride, the step which comprises reacting a fluoride of an alkali metal of atomic member 11 to 55 with chlorine supplied by at least one member of the group consisting of elemental chlorine, sulfur dichloride and sulfur monochloride and sulfur supplied by at least one member of the group consisting of elemental sulfur, sulfur dichloride and sulfur monochloride under substantially anhydrous conditions and at a temperature between about 100 and 300° C.

8. In the preparation of sulfur tetrafluoride, the step which comprises reacting a member of the group consisting of sodium and potassium fluorides with elemental sulfur and elemental chlorine under substantially anhydrous conditions and at a temperature between about 100 and 300° C.

9. In the preparation of sulfur tetrafluoride, the step which comprises reacting a member of the group consisting of sodium and potassium fluorides with sulfur dichloride under substantially anhydrous conditions and at a temperature between about 100 and 300° C.

10. In the preparation of sulfur tetrafluoride, the step which comprises reacting a member of the group consisting of sodium and potassium fluorides with sulfur dichloride and elemental chlorine under substantially anhydrous conditions and at a temperature between about 100 and 300° C.

11. In the preparation of sulfur tetrafluoride, the step which comprises reacting a member of the group consisting of sodium and potassium fluorides with sulfur monochloride under substantially anhydrous conditions and at a temperature between about 100 and 300° C.

12. In the preparation of sulfur tetrafluoride, the step which comprises reacting a member of the group consisting of sodium and potassium fluorides with sulfur monochloride and elemental chlorine under substantially anhydrous conditions and at a temperature between about 100 and 300° C.

13. In the preparation of sulfur tetrafluoride, the step which comprises reacting sulfur dichloride with a fluoride of an alkali metal of atomic number 11–55 at a temperature of about 20–150° C. under substantially anhydrous conditions in a liquid reaction medium which is substantially inert towards the reactants at the reaction temperature and which has a dielectric constant at 20° C. of at least about 20.

14. The process of claim 13 wherein the temperature is about 40–90° C.

15. The process of claim 13 wherein the liquid reaction medium is a nitrile.

16. In the preparation of sulfur tetrafluoride, the step which comprises reacting sulfur dichloride with a member of the group consisting of sodium and potassium fluorides at a temperature of about 20–150° C. under substantially anhydrous conditions in acetonitrile.

17. In the preparation of sulfur tetrafluoride, the step which comprises reacting sulfur dichloride with a member of the group consisting of sodium and potassium fluorides at a temperature of about 20–150° C. under substantially anhydrous conditions in benzonitrile.

18. In the preparation of sulfur tetrafluoride, the step which comprises reacting sulfur dichloride with a member of the group consisting of sodium and potassium fluorides at a temperature of about 20–150° C. under substantially anhydrous conditions in cyclic tetramethylene sulfone.

References Cited in the file of this patent

Mellor: "Comprehensive Treatise on Inorganic and Theoretical Chemistry," Supp. II, Part I, 1956, page 58, vol. 10, 1930, p. 630.

Bailar: "Inorganic Synthesis," 1953, vol. IV, pages 133–141.

UNITED STATES PATENT OFFICE

CERTIFICATE OF CORRECTION

Patent No. 2,992,073            July 11, 1961

Charles W. Tullock

It is hereby certified that error appears in the above numbered patent requiring correction and that the said Letters Patent should read as corrected below.

Column 12, line 22, for "member" read -- number --.

Signed and sealed this 3rd day of April 1962.

(SEAL)
Attest:

ERNEST W. SWIDER            DAVID L. LADD
Attesting Officer            Commissioner of Patents